United States Patent [19]
Wojtowicz et al.

[11] 3,890,338
[45] June 17, 1975

[54] ETHANOLYSIS OF 3-TRICHLOROMETHYL-5-CHLORO-1,2,4-THIADIZOLE EMPLOYING AQUEOUS BASE

[75] Inventors: John A. Wojtowicz, Chesire; Sudhir K. Bhutani, West Haven, both of Conn.

[73] Assignee: Olin Corporation, New Haven, Conn.

[22] Filed: May 2, 1974

[21] Appl. No.: 466,434

[52] U.S. Cl............................................. 260/302 D

[51] Int. Cl............................................. C07d 91/60
[58] Field of Search.............................. 260/302 D

*Primary Examiner*—Richard J. Gallagher
*Attorney, Agent, or Firm*—Robert L. Andersen

[57] ABSTRACT

3-Trichloromethyl-5-lower alkoxy-1,2,4-thiadiazole is prepared by an improved process wherein a selected base and a lower alkanol are reacted directly with 3-trichloromethyl-5-chloro-1,2,4-thiadiazole at ambient temperature, the reaction mixture neutralized and phased to recover product.

10 Claims, No Drawings

ETHANOLYSIS OF 3-TRICHLOROMETHYL-5-CHLORO-1,2,4-THIADIZOLE EMPLOYING AQUEOUS BASE

BACKGROUND OF THE INVENTION

The present invention relates to a process for producing 3-trichloromethyl-5-lower alkoxy-1,2,4-thiadiazole from 3-trichloromethyl-5-chloro-1,2,4-thiadiazole in which (1) aqueous base rather than flake caustic may be used, (2) an alkanol/water solvent rather than a large excess of alkanol is employed, (3) refrigeration is eliminated and (4) productivity is increased by the elimination of a vacuum distillation step, by elimination of a separate step to preform sodium ethylate and by substantially reducing the amount of alkanol solvent which must be recovered and recycled.

The uses for 3-trichloromethyl-5-ethoxy-1,2,4-thiadiazole are well known to those skilled in the art. It and its homologues are valuable soil fungicides which, when mixed into the soil, protect seeds and growing plants against a broad spectrum of pathogenic fungi, like species of Pythium, Fusarium, Rhizoctonia, and Sclerotium.

In the prior process, 3-trichloromethyl-5-ethoxy-1,2,4-thiadiazole was produced by preforming sodium ethylate in a separate step by dissolving flake caustic in a large excess of recycled ethanol under refrigeration. The ethylate/ethanol solution was added slowly to 3-trichloromethyl-5-chloro-1,2,4-thiadiazole and a minor portion of recycled ethanol. The reaction mixture was refrigerated and the reaction conducted at a temperature in the range of 0°–20°C. The ratio of ethanol to 3-trichloromethyl-5-chloro-1,2,4-thiadiazole employed was about 16:1 or greater. When the reaction was substantially complete, the solvent was removed from the resulting reaction mixture by vacuum stripping. The recovered solvent was recycled and water added to the residuum in quantities sufficient to dissolve the water soluble salts formed during the reaction. The water/residuum mixture was then phased, the water phase discarded and the lower product phase vacuum stripped to remove any remaining water.

In the prior process, an additional step was required to preform sodium ethylate. We have found that this step may be completely eliminated and base added directly to the reaction mixture. In the prior process, it was necessary to refrigerate during the ethylate formation step and during the reaction of the ethylate with the 5-chloro compound. Schroeder, U.S. Pat. No. 3,260,725 indicates that higher temperatures may be utilized to react the preformed ethylate with the 5-chloro compound. We have now found that higher temperatures may also be advantageously employed where the separate ethylate formation step is eliminated and the alkanol and base reacted directly with the 5-chloro compound, thus eliminating the ethylate formation step and completely eliminating the refrigeration requirement.

The principal disadvantage of the prior process resided in the time required to remove solvent after completion of the reaction. The vacuum stripping of solvent required 16–18 hours to complete. Since a batch process is preferred, this greatly impaired productivity of the process. We have now found that by employing water and a lower alkanol to 3-trichloromethyl-5-chloro-1,2,4-thiadiazole molar ratio, we can eliminate this stripping step, phase the reaction mixture, and thereby obtain about a four-fold increase in productivity over the prior process.

In the prior process, washing and phasing following solvent stripping was extremely unsatisfactory for several reasons. First, a period of 2–4 hours or more was required to wash and phase each batch due to slow and incomplete phase separation. Secondly, the resulting mixture contained a large emulsion phase at the interface of the organic and aqueous layers, and this emulsion had to be recycled since it contained a large amount (20–40 percent) of total product yield. This recycle unduly complicated product recovery and also reduced potential yield and productivity.

In the present process, the emulsion phase is extremely small and can be conveniently recycled or discarded without unduly impairing yields since the emulsion now contains less than 1% of the total yield. Also phasing in the present process is both rapid and complete, requiring less than half the time required in the prior process.

Finally, selectivity in the present process exceeds that obtainable in the prior process. In the prior process, selectivity was about 86–88 percent. This is increased to about 96 percent in the present process. Conversion is about the same in the two processes so yields are improved by improving selectivity.

It is also an advantage of the present invention that after neutralizing excess base and phasing, the separate phases can be transferred to holding tanks and stored until sufficient volume is accumulated to justify topping. This is made possible by the use of a neutralization step which prevents product degradation which would otherwise occur in the presence of excess base. This in turn frees up reactors and effects a substantial increase in productivity without a substantial increase in capital investment in equipment.

SUMMARY OF THE INVENTION

In accordance with the present invention, the above objects and advantages may be achieved in the production of 3-trichloromethyl-5-lower alkoxy-1,2,4-thiadiazole by reacting 3-trichloromethyl-5-chloro-1,2,4-thiadiazole with a selected base and a lower alkanol having 1-4 carbon atoms at a temperature of ambient to 120°C. in a reaction mixture comprising water, 1.01-4 preferably 1.05-2 moles of said base and 1-15 moles of said alkanol per mole of 3-trichloromethyl-5-chloro-1,2,4-thiadiazole; neutralizing the resulting reaction mixture, phasing the neutralized reaction mixture and recovering 3-trichloromethyl-5-lower alkoxy-1,2,4-thiadiazole.

DETAILED DESCRIPTION

In accordance with the present invention, it is preferred to add the selected base to a mixture of 3-trichloromethyl-5-chloro-1,2,4-thiadiazole in an alkanol or alkanol/water mixture.

The starting reactant, 3-trichloromethyl-5-chloro-1,2,4-thiadiazole, and a suitable method for its preparation is known to those skilled in the art, and one such process is described generally in U.S. Pat. No. 3,260,725.

Suitably, 3-trichloromethyl-5-chloro-1,2,4-thiadiazole is dissolved in or mixed with a suitable amount of solvent prior to addition of base. Suitably, such solvent may be an alkanol having 1-4 carbon atoms such as methanol, ethanol, n-propanol, i-propanol, n-butanol, or i-butanol which corresponds to the thiadiazole derivative to be formed. In the preferred embodiment, ethanol is utilized and the corresponding final product is 3-trichloromethyl-5-ethoxy-1,2,4-thiadiazole.

Suitably, such alkanol is employed in lower amounts than have heretofore been employed in the manufacture of this group of compounds. Suitably, 1-15, desirably 1-10, and preferably 1-5 moles of alkanol are employed per mole of 3-trichloromethyl-5-chloro-1,2,4-thiadiazole to provide a molar ratio of 1:1 to 15:1, desirably 1:1 to 10:1, preferably 1:1 to 5:1.

The cost of the alkanol component of the reaction mixture is an important factor in determining the amount of alkanol to be employed. Equally important, however, is the fact that to operate the present process efficiently, the alkanol must be stripped from the product, recovered and recycled. In general, both cost and productivity are adversely affected as the above-described molar ratio increases toward its upper limits. Suitably, any commercially available form of the desired alkanol may be employed. Where ethanol is used, it is preferred from a cost standpoint to utilize denatured ethanol. The denaturant, however, has been ignored for purposes of describing the present invention, as it plays no role in the reaction. The denaturant may be any commonly used denaturant and this may be purged from the system by any known means to prevent undue dilution of solvent.

The water component of the reaction mixture may be present prior to commencing base addition or be added wholly or partly with the selected base. In the prior process, water content was kept to a minimum in order to minimize the volume of the reaction mixture. In the present process, however, water is provided in an amount sufficient to provide a concentration in the total reaction mixture of 15-70 percent by weight, advantageously 35-70 percent by weight, preferably 50-70 percent by weight. In the preferred embodiment, sufficient water is present to dissolve substantially all water soluble salts formed during the reaction in order to eliminate a separate salt dissolution step prior to product work-up. Any amount in excess of about 50 percent by weight of the total reaction mixture is suitable for this purpose, but the use of quantities resulting in a concentration of greater than 70 percent is unnecessary in that it tends only to increase volume of each batch and dilute the reaction mixture to a point where reaction time may have to be increased. Such increased water content does not provide any additional benefit in the process. On the other hand, utilization of a water content of 15-50 percent by weight of the final reaction mixture does not substantially affect yields, but does necessitate filtration of the reaction mixture or addition of additional water at some point to dissolve salts formed during the reaction.

After mixing the starting reactant and alkanol and a desired amount of water, the temperature of the reaction mixture is adjusted (if desired) and maintained at a selected temperature between ambient temperature and 120°C. depending on the alkanol being employed. With ethanol, the preferred range is ambient to about 80°C. With higher alkanols, upper limit is higher and may be at least as high as 120°C. These temperature ranges are maintained throughout base addition and any post addition reaction period. The use of these temperatures eliminates the need for refrigeration and thus results in substantial cost savings over the prior process.

The base is then preferably added to the reaction mixture described above, preferably with stirring or agitation, preferably in aqueous solution and preferably slowly so that the base is well distributed throughout the reaction mixture. As the base is added, it reacts rapidly with the starting reactant and alkanol to form the corresponding alkoxy derivative. Suitably, the selected base may be added over a period of ¼ to 4 hours, preferably ½ to 2 hours depending on the amount of stirring, the concentration of the base, etc.

In the present process, any base may be employed which will break or weaken the bond between chlorine and the thiadiazole ring and make the ring susceptible to attack by the alkanol. Thus, an alkali metal, alkaline earth metal or ammonium hydroxide, oxide or carbonate may suitably be employed in the process.

Advantageously, hydroxides of sodium, potassium, calcium, barium, magnesium, and ammonium may be employed, preferably sodium, ammonium, or potassium hydroxide. Suitable oxides include oxides of calcium, barium, and magnesium. Suitable carbonates include sodium, potassium, ammonium carbonates, preferably sodium carbonate or soda ash.

Where sodium hydroxide is employed as the base, it is preferable to utilize a 50% aqueous solution since this is a readily available form. While it is preferred to add base to the other reactants and to add it in aqueous form, the ingredients may be mixed in any manner which will avoid product degradation due to excess alkalinity.

Following incorporation of base to the reaction mixture, the reaction is permitted to proceed to completion for a suitable post addition reaction period. Generally, ¼ to 1 hour will suffice unless extremely high water concentration is present in the reaction mixture. Water concentrations on the order of 60-80 percent, for example, slow the reaction rate and make it necessary to suitably increase post addition reaction times, for example, to 1-3 hours. Excessively long post reaction periods should be avoided. Permissible times will depend on the amount of excess base used and on water content. Since this limitation is variable it is recommended to neutralize and phase within 4 hours of completing caustic addition.

A molar excess of base is employed in the reaction, but it is preferable to keep the excess relatively small. For example, 1.01 to 4 moles, preferably 1.05-2 moles, of base per mole of 3-trichloromethyl-5-chloro-1,2,4-thiadiazole or a molar ratio of 1.01:1 to 4:1, preferably 1.05:1 to 2:1 may be employed in the process.

Following a suitable post addition reaction period, the reaction mixture neutralized to a pH below 8, preferably about 5-8 with a mineral acid such as HCl, $H_2SO_4$ or $HNO_3$ which will produce a water soluble salt when reacted with the selected base. This neutralizes the excess base present in the reaction mixture and induces salt formation which in turn prevents product degradation during subsequent handling steps. Neutralization also facilitates solvent recovery and recycle.

Assuming sufficient water is present in the neutralized reaction mixture, the resulting salts will be dissolved. If insufficient water is present, the reaction mixture may be filtered or additional water added to effect dissolution of these water soluble salts.

The reaction mixture is then allowed to separate into an upper aqueous, a lower organic, and an intermediate emulsion phase. In accordance with the present process, satisfactory separation is obtained in 15 minutes to 1 hour. The mixture is then phased by any known means. Product is recovered from the lower organic layer suitably by vacuum topping to remove and recover the alkanol. The aqueous upper layer containing dissolved salts is suitably distilled to recover and alkanol/water mixture and the remaining concentrated saline solution is suitably discarded.

Solvent recovered from both the lower and upper phase is returned to the reaction vessel and additional alcohol and water added as needed for the processing of a succeeding batch.

The emulsion phase, preferably separated during phasing, contains a relatively minor amount (less than 1 percent and usually less than 0.5 percent) of of the total product formed. This phase may either be recycled to the phasing step of a subsequent batch or discarded. Since it contains so little product it may also be separated with the aqueous phase and discarded, or with the organic phase and filtered after topping to recover entrained product.

Having thus fully described the process which constitutes the present invention, the following examples illustrate the effect of various modifications therein.

EXAMPLE I

This example demonstrates a modification of the prior process. A 10 percent excess of aqueous NaOH was employed, the excess was neutralized after the reaction period, but instead of phasing the reaction mixture, it was distilled as in the prior process.

Aqueous sodium hydroxode (88.0g, 50 weight per cent 1.10 mole) was added at a uniform rate (over 3.87 hours) to a well-stirred mixture of I (243.3g, 97.8 per cent assay, 1.00 mole) and 76 weight percent ethanol (171.7g, containing about 16 percent water and 7 per cent benzene); the temperature was maintained at 30° ± 3°C. After a 0.38 hour post reaction period, the excess base was neutralized with 37 per cent aqueous HCL (5.8 ml). The excess ethanol and water were distilled first at atmospheric pressure and then at subatmospheric pressure. Water, 245g, was added to the stripped crude product to dissolve salt, and the mixture was phase-separated. The lower product layer was stripped of volatiles under vacuum at about 90°C. The emulsified interphase was extracted with ether and the extract stripped to recover product. The product fraction weight and analyses are as follows:

| FRACTION | STRIPPED WEIGHT (G) | CONVERSION (%) | SELECTIVITY (%) |
|---|---|---|---|
| Main Product | 212.1 | 99.9 | 96.3 |
| Product From Emulsion | 36.1 | 99.9 | 95.4 |

About 15.4 percent of total product appeared in the emulsion phase which had to be recycled to the subsequent batch. Thus, while overall conversion and selectivity were increased over the prior process, distillation of the reaction mixture, even after neutralization was an unsatisfactory means for recovering product and solvent.

EXAMPLE II

In this example, additional water was added to dissolve formed salts. Following neutralization the reaction mixture was then phased and each phase stripped separately to recover solvent and product.

Aqueous sodium hydroxide (84.0g, 50.0 per cent assay, 1.05 mole) was added at a uniform rate over a 3.75 hour period to a well-stirred mixture of 3-trichloromethyl-5-chloro-1,2,4-thiadiazole (243.3g, 97.8 per cent assay, 1.0 mole) and 75 per cent ethanol (171.7g, containing 15 percent water and 10 percent benzene). The temperature was maintained at 30° ± 3°C. by external cooling. After a 0.25 hour post reaction period, the reaction mixture was neutralized to phenolphthalein with 3.0 ml of 37 per cent hydrochloroc acid. Water, 125g, was added to dissolve suspended salt and the mixture was stirred for ten minutes and allowed to settle for fifteen minutes to permit separation of phases. The lower (product) layer (271.0g) was drawn-off and stripped of solvent at 20-25 Torr and 90°-95°C. The emulsified interphase (11.0g) was extracted with ether to recover product and the extract stripped as described above.

The product weights and composition are given below.

| FRACTION | STRIPPED WEIGHT (G) | CONVERSION (%) | SELECTIVITY (%) |
|---|---|---|---|
| Main Product | 242.1 | 99.5 | 96.3 |
| Product From Emulsion | 3.8 | 99.5 | 97.0 |

By phasing prior to solvent recovery, product in the emulsion phase was reduced to about 1.25 percent of total product, of 12 fold improvement over the modification shown in Example I.

EXAMPLE III

This example demonstrates the effect of having present about 50% water in the reaction mixture.

The reaction of Example I was repeated at 30°C. using 1.11 mole of 50 per cent sodium hydroxide, 171.7g of 75 per cent ethanol, one mole of 3-trichloromethyl-5-chloro-1,2,4-thiadiazole and 150g of water. The caustic addition time was 3.87 hours with a 1.63 hour post reaction period. The product was isolated as described in Example II. The product weights and composition are given below.

| FRACTION | STRIPPED WEIGHT (G) | CONVERSION (%) | SELECTIVITY (%) |
|---|---|---|---|
| Main Product | 240.8 | 99.6 | 97.0 |
| Product From Emulsion | 1.9 | 99.8 | 97.2 |

By using a high concentration of water in the reaction mixture, a separate salt dissolution step was eliminated and product in the emulsion phase was reduced to less than 1 percent of total yield.

We claim:

1. A process for producing 3-trichloromethyl-5-lower alkoxy-1,2,4-thiadiazole comprising:

reacting 3-trichloromethyl-5-chloro-1,2,4-thiadiazole with an aqueous base selected from the group consisting of aqueous alkali metal, alkaline earth metal or ammonium hydroxides, oxides or carbonates and a lower alkanol having 1-4 carbon atoms at a temperature of ambient to 120°C. in a reaction mixture comprising water, 1.01-4 moles of said base and 1-15 moles of said alkanol per mole of 3-trichloromethyl-5-chloro-1,2,4-thiadiazole; thereafter neutralizing said reaction mixture, phasing the neutralized reaction mixture and recovering 3-trichloromethyl-5-lower alkoxy-1,2,4-thiadiazole.

2. The process of claim 1 in which the water content of said reaction mixture is 15 to 70 percent by weight.

3. The process of claim 2 in which such water content is sufficient to dissolve water soluble salts precipitated during said reaction.

4. The process of claim 2 wherein said water content is 50–70 percent by weight.

5. The process of claim 2 wherein said reaction mixture is neutralized to a pH below 8 prior to phasing.

6. The process of claim 5 wherein the reaction mixture is phased and solvent recovered from each phase and recycled to the reaction step.

7. The process of claim 5 wherein said 3-trichloromethyl-5-lower alkoxy-1,2,4-thiadiazole is 3-trichloromethyl-5-ethoxy-1,2,4-thiadiazole and said alkanol is ethanol.

8. The process of claim 7 wherein said temperature is from ambient to 80°C.

9. The process of claim 7 wherein said base is an alkali metal hydroxide.

10. A process for producing 3-trichloromethyl-5-ethoxy-1,2,4-thiadiazole comprising:

slowly adding a molar excess aqueous sodium hydroxide to an agitated mixture comprising ethanol and 3-trichloromethyl-5-chloro-1,2,4-thiadiazole, in which 1-5 moles of ethanol are present per mole of 3-trichloromethyl-5-chloro-thiadiazole to produce a resulting reaction mixture having a water content of 15-70 percent by weight, thereafter neutralizing the resulting reaction mixture to a pH of 5-8, phasing the neutralized reaction mixture recovering 3-trichloromethyl-5-ethoxy-1,2,4-thiadiazole and solvents, and recycling solvent to the reaction step.

* * * * *